United States Patent Office 3,428,864
Patented Feb. 18, 1969

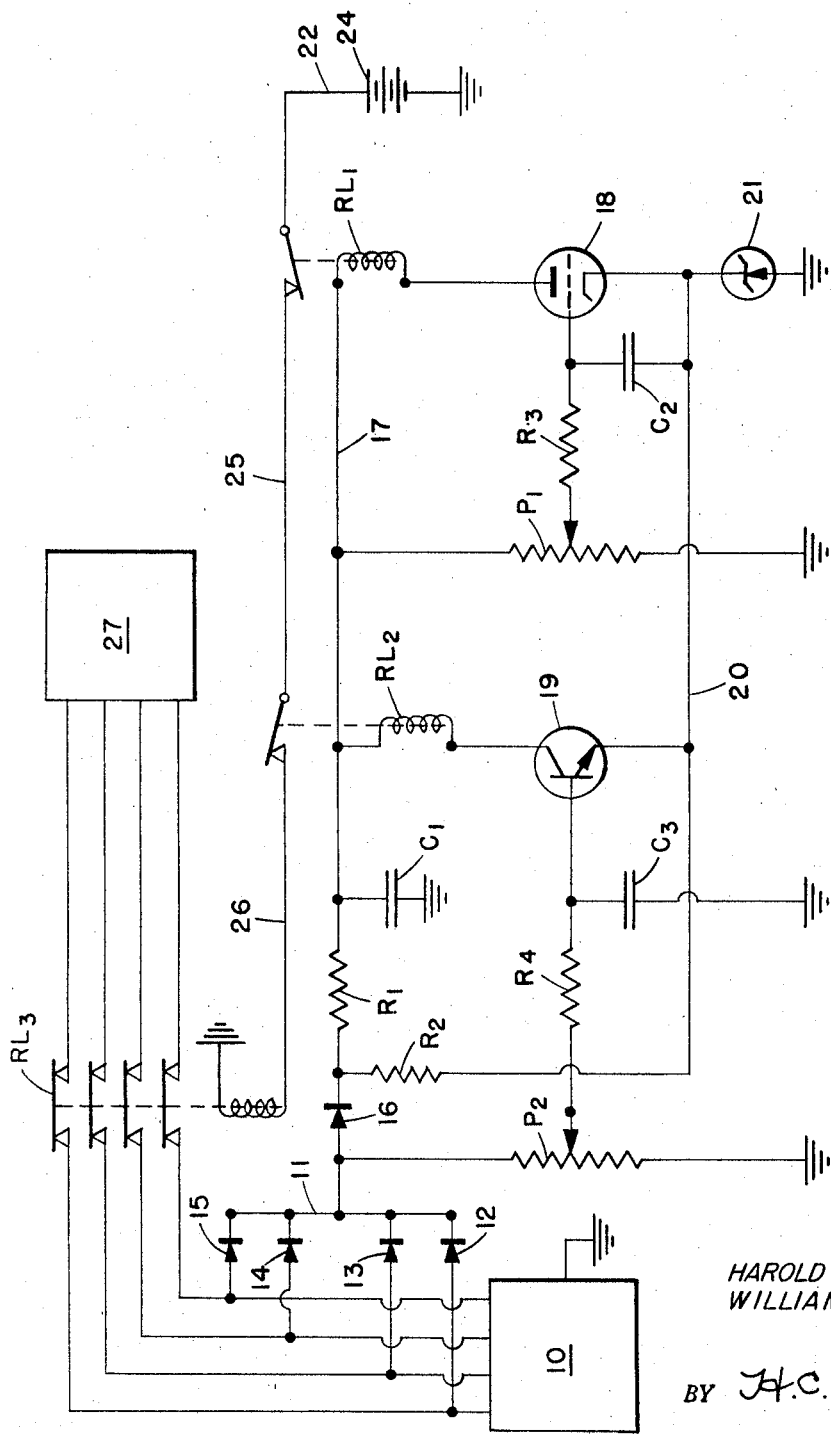
HAROLD G. BARBER
WILLIAM G. REDMOND
INVENTORS
BY H.C. Goldwire
AGENT

3,428,864
MULTIPHASE VOLTAGE MONITORING SYSTEM
Harold G. Barber, Irving, and William G. Redmond, Arlington, Tex., assignors to Ling-Temco-Vought, Inc., Dallas, Tex., a corporation of Delaware
Filed Apr. 29, 1963, Ser. No. 276,299
U.S. Cl. 317—31
Int. Cl. H02h 3/28
6 Claims This invention relates to protective devices for electrical circuits and more particularly to a system for monitoring voltage values of an electrical power source.

The voltage monitoring system of the present invention is particularly useful in causing a desired event or events to occur in consequence of the appearance of an excessively high or low voltage in a power source; such an event, for example, is the provision of an indication of the occurrence of the voltage abnormality and/or the disconnection of a load from the power supply.

While a number of voltage monitoring devices have previously been employed, all have failed to be completely satisfactory in one or more important respects. Among the features to be desired in a voltage monitoring device are accuracy and sensitivity of operation. In addition, for example in an aircraft, small size and weight and high reliability of operation are of prime importance, and cost is always of importance. Unfortunately, the attainment of some of these desirabilities has tended to be inconsistent with concurrent attainment of the rest; for example, efforts to attain a high sensitivity and accuracy tend to result in a device of a large number of components and hence of reduced reliability and increased size, weight, and cost.

It is, therefore, a major object of the present invention to provide a voltage monitoring device of high accuracy and reliability.

A related object is to provide a voltage monitoring device of improved simplicity and minimum size, weight, and cost.

Other objects and advantages will become apparent from the specification and claims and from the accompanying drawing illustrative of an embodiment of the invention.

In the drawing, there is shown a circuit diagram of a preferred embodiment of the invention, movable components being represented in their positions occupied when voltage values of the power supply are normal.

With reference to the drawing, the system is shown as employed for monitoring a multiphase A-C power source 10 for over- and under-voltage. The power source 10 may comprise any number of phases and is connectible into a load 27 through the contacts of a preferably normally open main power control relay $RL_3$.

Means for providing a first, positive D-C voltage from the multiphase power source 10 comprise a bus 11 and means, such as the rectifiers 12, 13, 14, 15 which combine the positive pulses of all the multiple phases onto the bus. The form of the bus 11 is not critical; it may, for example, be a bar, wire, rod, or terminal, etc. to which all the power source conductors are connected through their respective rectifiers 12–15 which are oriented to permit passage of the positive pulses onto the bus. Diode vacuum tubes are useable for the rectifiers 12–15, but semi-conductor rectifiers (for example, of silicon) are preferred because of the lower voltage drop across them and because of their ruggedness and other advantages. An isolating rectifier 16 is connected between the bus 11 and the first end of a surge-limiting resistor $R_1$ between the second end of which and ground there is connected a first capacitor $C_1$; also connected to the second end of resistor $R_1$ is a first lead 17. As will be seen, capacitor $C_1$ constitutes an electron charge storing means which co-operates with the bus 11 and the rectifiers 12–15 combining the positive pulses of the power source 10 onto the bus for supplying a substantially smooth D-C voltage proportional to and substantially equalling the positive voltage peaks of the highest-voltage of one of the multiple phases.

The switching means includes a pair of relays $RL_1$ and $RL_2$ and, as will be later described, may include still another component or components. The relays $RL_1$, $RL_2$ provide first and second switching means each with a controlled circuit including its movable contacts and with a control circuit including its winding, the latter being connected as will be described. Relay $RL_1$ is normally closed, while relay $RL_2$ is normally open. During operation of the power source 10 within a voltage range designated as normal, the relay $RL_1$ is de-energized, while relay $RL_2$ is energized; thus, the contacts of both relays $RL_1$, $RL_2$ are closed.

The system employs a pair of voltage-responsive current-control devices 18, 19 which may be vacuum tubes or transistors or other devices capable of serving the purposes set forth. In all cases, each current-control device 18, 19 has first and second electrodes (for example, a plate and cathode or collector and emitter) between which electrical current flows when the device conducts; with current flow regarded in the conventional manner as from positive to negative, flow through the device is from the first to the second electrode. Each current-control device 18, 19 further has a control electrode (for example, a grid or base) for receiving a control voltage for controlling current flow through the device. In this connection, it will be noted that while some transistors are responsive to current flow through the base, the magnitude of base current flow in turn is a function of the voltage supplied to the base and hence, in this sense, these transistors (in common with a grid-controlled vacuum tube) are voltage-responsive. In the drawing, one tube 18 and one transistor 19 are shown for purposes of illustrating the use of both tubes and transistors; actually, a pair of transistors, a pair of tubes, or one of each may be employed. In any case, the first electrode of each current-control device 18 or 19 is connected, through the winding of a respective relay $RL_1$ or $RL_2$, to the first lead 17 to receive therefrom the first, positive D-C voltage.

Means are provided for supplying a stable reference voltage directly to the second electrode of each current-control device 18, 19, this means receiving the first D-C voltage and producing from a portion thereof the stable reference voltage. A second resistor $R_2$ is connected at its first end to the first end of resistor $R_1$ between the latter and the isolating rectifier 16 and at its other end to a second lead 20, the latter being connected directly to the respective second electrodes of the first and second current-control devices 18, 19. A voltage-regulating device 21 such as a Zener diode or a gas-filled voltage regulator tube is connected between the second lead 20 and common ground. It will be noted that the connection of the stable reference voltage to the second electrodes of the current-control devices 18, 19 is direct, and that the windings of the relays $RL_1$, $RL_2$ are connected between the first lead 17 and the current-control devices 18, 19 rather than between the latter and the second lead 20.

The means supplying a first D-C control voltage to the first current-control device control electrode comprises a first potentiometer $P_1$ which receives the first D-C voltage from the first lead 17 and produces therefrom the first D-C control voltage. The potentiometer $P_1$, the resistance element of which has a first end receiving the first D-C voltage and a second end connected to common ground, has a wiper connected to the control electrode of the first current-control device 18 and adjusted along the resistance element as will be described in a later paragraph. A time delay device is provided in form of a third resistor $R_3$ which is placed in the lead connecting the wiper of potentiometer $P_1$ to the control electrode of the first current-control device 18 and a capacitor $C_2$ which is connected between the control electrode and a point of fixed potential such as the second lead 20.

A second D-C control voltage is supplied to the control electrode of the second current-control device 19 by means comprising a second potentiometer $P_2$ whose resistance element is connected between the bus 11 and ground. Potentiometer $P_2$ thus receives the summed positive pulses of the multiphase power source and is isolated from the first D-C voltage on the first lead 17 by the isolating rectifier 16. A fourth resistor $R_4$ is connected between the wiper of the second potentiometer $P_2$ and the control electrode of the second current-control device 19, while a third condenser $C_3$ is connected between the control electrode and ground.

The circuit passing through and controlled by the switching means $RL_1$, $RL_2$ includes a lead 22 connecting a respective first one of the relatively movable contacts of the relay $RL_1$ to a control power source 24, lead 25 connecting the second contact of the relay $RL_1$ to the first contact of relay $RL_2$, and a lead 26 connecting the second contact of the relay $RL_2$ to a device or devices utilizing power from the source 24 upon closure of both of the relays $RL_1$, $RL_2$. Such a device could take the form of a lamp or other indicating device for advising of an abnormal voltage condition in the multiphase power source 10. In a preferred form of the system, however, the switching means comprises a further component additional to the first and second current-responsive switching means $RL_1$, $RL_2$, which component is a main power control relay $RL_3$. The second contact of relay $RL_2$ is connected to one end of the winding of the main power control relay $RL_3$, the other end of which last-named winding is connected to ground. As mentioned previously, the contacts of the main power control relay $RL_3$ of the specific example are normally open, whereupon the multiphase power source 10 is disconnected from the load 27, and are closeable for connection of the load into the multiphase power source.

By virtue of the rectifiers 12–15 connected between the bus 11 and the various leads of the multiphase power source 10, the positive components of all the multiple phases of the power source are impressed on the bus and fed through the isolating rectifier 16 and surge limiting resistor $R_1$ to the first capacitor $C_1$ and first lead 17. Capacitor $C_1$ thus operates to hold the highest positive voltage imposed upon it, which voltage is that of the positive peaks of the highest-voltage one of the multiple phases of the power source 10. Consequently, the first D-C voltage is substantially as high as the highest positive voltage component of the power source 10, and changes in the first D-C voltage are approximately in proportion to changes in the A-C value of the power source. This voltage, applied to the second terminals of the windings of relays $RL_1$, $RL_2$, is supplied as described to the first electrodes of the first and second current-control devices 18, 19. The surge-limiting resistor $R_1$ is of a value which prevents a current flow high enough to damage the rectifiers 12–16 and/or condenser $C_1$ in the event the system is first turned on at or near the positive peak of one of the phases of the power source 10 and which concurrently has the smallest possible voltage drop across it in order that operation of the current-control devices 18, 19 will not significantly drop the voltage on the first lead 17.

The voltage drop across the voltage-regulating device 21 is, within practical limits, independent of current flow therethrough, and the values of the voltage-regulating device are chosen to maintain on the second lead 20 a positive voltage (the term "positive" being consistently employed herein with reference to ground) which is enough lower than the first D-C voltage to place a voltage gradient across the current-control devices 18, 19 sufficient to supply adequate current for operation of relays $RL_1$, $RL_2$. The stable reference voltage, in the preferred embodiment, is a major fraction of the level of the first D-C voltage obtained during normal operation of the multiphase power source. As to the value of the resistor $R_2$, this is low enough to provide as much current through the voltage regulating device 21 as is required for maintaining a constant voltage on the second lead 20 within a desired operating range of voltages on the first lead 17 and high enough to prevent over-current damage to the Zener diode 21 or equivalent when voltages on the first lead 17 are at the high end of the operating range.

The wiper of potentiometer $P_1$ is adjusted to a position at which the first D-C control voltage, supplied through the wiper, is low enough to prevent conducting of the first current-control device 18 when the first D-C voltage, to which the first D-C control voltage is proportional, is below a desired allowable maximum. For reasons which will become apparent, the first D-C control voltage is set to be quite close to the stable reference voltage when the power source voltage reaches a desired allowable maximum; for example, it may be set one volt below the voltage of the second lead 20 at such time. As long as the voltages of the positive components of none of the multiple phases of the power source 10 rise above the maximum tolerable level, the first control voltage prevents any substantial conducting of the first current-control device 18 and relay $RL_1$ remains de-energized, thus leaving relays $RL_1$, $RL_2$ closed and the load 27 connected to the power source 10. Upon the first D-C voltage (proportional to the highest voltage present in the A-C power source 10) rising to its maximum tolerable value, however, the first control voltage rises to a value at which the first current-control device 18 conducts through relay $RL_1$ and opens the contacts of the latter, thus energizng the winding of and opening the contacts of the main power control relay $RL_3$ and hence disconnecting the load 27 from its power source 10.

More remains to be discussed, however, in regard to over-voltage operation of the system. Relays are notoriously susceptible to changes in the current level required for their pick-up or drop-out and in the voltage across them required to produce that current; relatively large in even the more expensive and precisely manufactured relays, these changes result from temperature variations, changes in friction between moving parts, armature adjustment variations, etc. As a consequence, a relay carefully designed and set to operate at a given current flow, corresponding to a given, maximum tolerable level of a monitored voltage, may nonetheless completely fail to respond when the given current flow is supplied and may require a much larger (or, for drop-out, smaller) current flow before operation occurs. Concurrently, temperature and other changes may greatly alter the resistance through a relay, with the result that the voltage across the relay required to produce therethrough a current of a given value may vary widely. Furthermore, the gain of a current-control device supplying a relay may vary. The present system is endowed with a sensitivity of response which readily supplies a first control voltage, in accompaniment to only a small rise of the first D-C voltage over a selected maximum, of the value required to obtain operation of the relay $RL_1$ in spite of changes such as mentioned above. As above stated, the control voltage supplied to the control electrode of the first current-control device 18 is quite near the stable reference voltage on the second lead 20 when the current-control device 18 conducts (or when its control voltage value is such that it should conduct) a current nominally sufficient to operate the first relay $RL_1$. For purposes of explanation, it will be assumed, however, that relay $RL_1$ has changed in its operating characteristics and will require a greater voltage across its winding to supply the current nominally requisite to its operation; furthermore, the current required for operation may have increased. An alternate or additional assumption is that the gain of the current-control device has, for example, decreased. Thus, the power source voltage has risen to its nominally maximum allowable level, but relay operation has not occurred. Assuming that the first D-C voltage on the first lead 17 continues to rise by only a small amount, however, a proportional increase occurs in the first control voltage from potentiometer $P_1$. This increase, though a small one, changes by a large percentage the difference between the first control voltage and the reference voltage, for the control voltage is quite close to being the same as the reference voltage; hence, current flow through the first current-control device 18 is greatly increased, and the relay $RL_1$ operates. This most beneficial mode of operation is made possible by employing a reference voltage, on the second lead, which is positive and of considerable magnitude relative to the first D-C voltage provided on the first lead; for the first control voltage then, while remaining close to the reference voltage, is comparable to the first D-C voltage with the result that a change in the latter is accompanied by a comparable change in the control voltage which effects a large percentagewise change in the difference between the control and reference voltages and hence in current flow through the first current-control device.

It will be noted that whereas the voltage supplied to the second electrode, in this case, the cathode, of the current-control device 18 is constant, that supplied to the plate increases with increase in power supply highest-phase voltage. Grid voltage is not the only factor influencing the magnitude of current flow between the plate and cathode, which, at least in a triode electronic tube or equivalent, is increased by an increase of positive charge on the plate. Far from being disadvantageous, then, the changes in voltage on the second lead 17 tend to increase current flow through the winding of relay $RL_1$ at the very time such increase is needed in the case where the current-control device 18 is a triode electronic tube and are of substantially no effect where a transistor, pentode electrode tube, etc, is employed. Parenthetically, it may be noted that the same desirable effect is obtained at the second current-control device 19, when the latter is a triode electronic tube, whereby current decrease is aided for securing drop-out of the second relay $RL_2$.

Where the time-delay means comprising the third resistor $R_3$ and second condenser $C_2$ is employed, resistor $R_3$ slows the flow of electrical charge from potentiometer $P_1$ which must occur to change the charge across condenser $C_2$ before a voltage change can appear at the control electrode of the first current-control device 18. In this manner, voltage changes at the control electrode are made to lag behind changes at the wiper of potentiometer $P_1$, and the values of resistor $R_3$ and condenser $C_2$ are chosen to provide a time delay of desired length. The purpose of the time delay is to prevent the system from responding to over-voltage conditions which are of such brief duration as to be insignificant. It will be noted that although the resistor $R_3$ and capacitor $C_2$ are of fixed value and non-adjustable in the specific example, the voltage drop across the resistor $R_3$ varies with the magnitude of voltage change, in a given interval of time, at the wiper of potentiometer $P_1$; as a consequence, the system reacts more quickly to a severe over-voltage and more slowly to a mild one. This advantage is important in view of the fact that damage to the load 27, power source 10, etc. occurs more quickly where the over-voltage is severe.

By virtue of the isolating rectifier 16, it is possible to employ a second control voltage which is approximately proportional to the average positive component of the multiphase power supply 10 and thus approximately proportional to the average of the A-C values of the multiple phases; for this reason, the potentiometer $P_2$ is connected between the isolating rectifier 16 and bus 11. It is also important to note that the isolating rectifier 16 permits the voltage of bus 11 to follow the voltages of the positive pulses from the power source 10 without influence from capacitor $C_1$. The fourth resistor $R_4$ and third capacitor $C_3$ are of such relative electrical values that they coact to convert the positive pulses of all the multiple phases of the power source 10 applied to the bus 11 into a substantially smooth D-C voltage, applied to the control electrode of the second current-control device 19, which is approximately proportional to the RMS average value of the phases of the power supply 10. The wiper of potentiometer $P_2$ is adjusted to a position in which the second current-control device 19 continues to energize the winding of the second relay $RL_2$ to hold the relay contacts closed when the power source average positive component is not below a desired minimum and de-energizes the winding to allow opening of the relay contacts when the power supply voltage falls below this minimum. Opening of the contacts of the second relay $RL_2$ results in de-energization of the winding and opening of the contacts of the main power control relay $RL_3$ to disconnect the load 27 from the power supply 10. In the event that the relay $RL_2$ does not close at the intended current value (corresponding to a voltage value of the power source 10), a small further decrease of the average positive component of the multiphase power source quickly brings the current-control device 19 substantially or altogether to shut-off, for the second control voltage again is quite close to the reference voltage and comparable with the voltage monitored. As a consequence, a small voltage drop in the monitored voltage results in a large percentage-wise change in the difference between the second control voltage and stable reference voltage and in the output of the second current-control device 19.

From the above, it will be understood that the second relay $RL_2$, second current-control device 19, potentiometer $P_2$, resistor $R_4$, and capacitor $C_3$ may be omitted to obtain operation of the system for monitoring only over-voltages, while only under-voltages will be monitored if the first current-control device 18 and correspondingly related items are omitted. In either event, or where the full system is employed as described above, it is important to note that the stable reference voltage is supplied directly to the second electrode of each current-control device 18, 19 and the winding of the associated relay $RL_1$ or $RL_2$, in each case, is connected between the first lead 17 and the first electrode of the current-control device 18 or 19. The constant voltage at the second electrode (corresponding to the cathode or emitter) permits the current-control device 18 or 19 to respond accurately and with full sensitivity to changes in the control voltages received. It would be most undesirable to place the associated relay winding between either current-control device 18 or 19 and the stable reference voltage provided on the second lead 20, for its resistance would produce a voltage drop across the winding when the current-control device 18 or 19 conducted, thus causing the cathode or emitter to become positive with regard to the constant reference voltage by an amount proportional to the rate of current flow and thereby undesirably altering the voltage difference which otherwise would exist between the cathode (or emitter) and the grid (or base), which alteration would in a sense diminish the sensitivity of operation of the current-control device 18 or 19 and associated relay $RL_1$ or $RL_2$.

It will be evident that, whereas the invention has been described as employing a first D-C voltage and a reference voltage which both are positive relative to ground, the polarities of the system may be reversed throughout by utilizing current-control devices requiring opposite polarities. It also will be noted that the system shown and described may be utilized for monitoring the voltages of an A-C power source of any number of phases including one and also may be employed for monitoring a D-C power source in which the power source positive component of course is the full positive voltage of the power source, as is the average positive component to which reference has been made.

While only one embodiment of the invention has been described herein and shown in the accompanying drawing, it will be evident that various modifications are possible in the arrangement and construction of the invention as well as in choice of its components without departing from the scope of the invention.

We claim:

1. A system for monitoring an A-C power source having multiple phases for over- and under-voltages, said system comprising:
   a bus;
   a plurality of rectifiers each connecting a respective phase of the power supply to the bus for conducting positive pulses of the power supply thereto;
   first and second relays each having a winding;
   first and second voltage-responsive current-control devices each having first and second electrodes between which electrical current flows when the device conducts, current flow being from the first to the second electrode, and a control electrode for receiving a control voltage controlling curent flow through the device;
   a first, surge-limiting resistor having first and second ends;
   an isolating rectifier connected between the first resistor first end and the bus;
   a first capacitor connected between the first resistor second end and ground;
   a first lead connecting the first current-control device first electrode to the first resistor second end through the first relay winding;
   a second resistor having first and second ends, the first end being connected to the first resistor first end;
   a second lead connecting the second resistor second end directly to the respective second electrodes of the first and second current-control devices;
   a voltage-regulating device connected between ground and the second lead for maintaining a substantially constant positive reference voltage thereon;
   a first potentiometer having a resistance element connected between the first lead and ground and further having a wiper;
   means connecting the wiper to the first current-control device control electrode and including a third resistor;
   a second capacitor connected between the first current-control device control electrode and the second lead;
   means connecting the second current-control device first electrode through the second relay winding to the first lead;
   a second potentiometer having a wiper and further having a resistance element connected between the bus and ground;
   a fourth resistor connecting the second potentiometer wiper to the second current-control device control electrode;
   and a third capacitor connected between the second current-control device control electrode and ground, the fourth resistor and third capacitor being of relative electrical values such that they coact to convert positive pulses from the bus into a substantially direct-current voltage.

2. The system of claim 1, wherein said plurality of rectifiers conduct negative pulses of the power supply.

3. A system for monitoring an A-C power source having multiple phases for under- and over-voltages and for controlling connection of the same to a load, said system comprising:
   a bus;
   a plurality of rectifiers each connecting a respective phase of the power supply to the bus for conducting positive pulses of the power supply thereto;
   an isolating rectifier connected to the bus;
   a capacitor connected between the isolating rectifier and ground for supplying a first, substantially smooth D-C voltage proportional to and substantially equaling the positive peaks of the highest-voltage one of the multiple phases;
   first and second voltage-responsive current-control devices each having first and second electrodes between which electrical current flows when the device conducts, current flow being from the first to the second electrode, and a control electrode for receiving a control voltage controlling current flow through the device, the first electrode of each of the current-control devices being connected to the isolating rectifier;
   a voltage regulating device connected between ground and the second electrodes of the first and second current control devices and to the isolating rectifier for maintaining a substantially constant voltage;
   means connected to the isolating rectifier and producing a magnitude of the positive pulses of the power supply proportional to the first D-C voltage, said first D-C control voltage being supplied to the first current-control device control electrode and being of a level whereat it allows conducting of the first current-control device when the first D-C voltage is above and prevents conducting of the same when the first D-C voltage is below a first predetermined level;
   means connected to the bus and supplying to the second current-control device control electrode a second D-C control voltage proportional to the supply voltage average positive component and of a level wherein it allows conducting of the second current-control device when the power source average positive voltage component is above and prevents conducting of the same when the power source average positive voltage component is below a second predetermined level;
   and switching means responsive to current flow through the current-control devices for connecting the load to the power source when, in the current-control devices, substantially no current flows through the first and current flows through the second and for disconnecting the load from the power source when current flows through both current-control devices and when substantially no current flows through either of the current-control devices.

4. A system for monitoring an A-C power source having multiple phases for over-voltage and for controlling connection of the same to a load, said system comprising:
   a bus;
   a plurality of rectifiers each connecting a respective phase of the power supply to the bus for conducting positive pulses of the power supply thereto;
   a first capacitor connected between the bus and ground for producing a first, substantially smooth D-C voltage proportional to and substantially equal to the positive peaks of the pulses of the highest-voltage one of the multiple phases;
   a voltage-responsive current-control device having first and second electrodes between which electrical current flows when the device conducts, current flow being from the first to the second electrode, and a control electrode for receiving a control voltage controlling current flow through the device, the first electrode of the current-control device being connected to the junction of the capacitor and the bus;
   a voltage regulating device connected between ground and the second electrode of the control device and to the junction of the capacitor and the bus for maintaining a substantially constant reference voltage;
   a potentiometer having a resistance element with a first end receiving the first D-C voltage and a second end connected to ground, the potentiometer further having a wiper connected to the control electrode of the current-control device and adjusted along the resistance element to provide to the control electrode a D-C control voltage proportional to the first D-C voltage and of a level whereat it allows conducting of the current-control device when the first D-C voltage is above and prevents conducting of the same when the first D-C voltage is below a predetermined level;

and switching means responsive to current flow through the current-control device for connecting the load to the power source when substantially no current flows through the current-control device and for disconnecting the load from the power source when current flows through the current-control device.

5. A system for monitoring an A-C power source having multiple phases for undervoltage and for controlling connection of the same to a load, said system comprising:

a bus;

a plurality of rectifiers each connecting a respective phase of the power supply to the bus for conducting positive pulses of the power supply thereto;

a voltage-responsive current control device having first and second electrodes between which current flows when the device conducts, current flow being from the first to the second electrode, and a control electrode for receiving a control voltage controlling current flow through the device;

a capacitor connected between the bus and ground for producing a first, substantially smooth D-C voltage proportional to and substantially equal to the peaks of the power source positive pulses and supplying the same to the current-control device first electrode;

a voltage regulating device connected between ground and the second electrode of the current control device and to the junction of the bus and the capacitor for maintaining a substantially constant reference voltage;

means producing a substantially smooth D-C control voltage proportional to the average positive component of the positive pulses, said means comprising: a potentiometer having a resistance element connected between the bus and ground and further having a wiper; a resistor connected between the wiper and the current-control device control electrode; and a capacitor connected between the control electrode and ground, the resistor and capacitor being of relative electrical values such that they coact to convert positive pulses from the bus into a substantially smooth D-C voltage on the control electrode, and the wiper being adjusted along the resistance element to a position in which the D-C control voltage allows conducting of the current-control device when the average positive component of the power source pulses is above, and prevents conducting of the same when the average positive component is below, a predetermined level;

and switching means responsive to current flow through the current-control device for connecting the load to the power source when current flows through the current-control device and for disconnecting the load from the power source when substantially no current flows through the current-control device.

6. A system for monitoring an A-C power source having multiple phases for under- and over-voltages and for controlling connection of the same to a load, said system comprising:

a bus;

a plurality of rectifiers each connecting a respective phase of the power supply to the bus for conducting positive pulses of the power supply thereto;

an isolating rectifier connected to the bus;

a first capacitor connected between the isolating rectifier and the ground for supplying a first, substantially smooth D-C voltage proportional to and substantially equaling the positive peaks of the highest-voltage one of the multiple phases;

first and second voltage-responsive current-control devices each having first and second electrodes between which electrical current flows when the device conducts, current flow being from the first to the second electrode, and a control electrode for receiving a control voltage controlling current flow through the device, the first electrode of each of the current-control devices being connected to the junction of the isolating rectifier and the first capacitor;

a voltage regulating device connected between ground and the second electrodes of the first and second current control devices and to the isolating rectifier for maintaining a substantially constant reference voltage;

means receiving the first D-C voltage and producing therefrom a first D-C control voltage proportional to the first D-C voltage, said first D-C control voltage being supplied to the first current-control device control electrode and being of a level whereat it allows conducting of the first current-control device when the first D-C voltage is above and prevents conducting of the same when the first D-C voltage is below a predetermined level;

means connected to the bus and supplying to the second current-control device control electrode a second D-C control voltage proportional to the source voltage average positive component and of a level wherein it allows conducting of the second current-control device when the power source average positive voltage component is above and prevents conducting of the same when the power source average positive voltage component is below a second predetermined level;

a first relay having first and second normally closed contacts and a winding connected to allow current flow therethrough to the first current-control device first electrode;

a second relay having first and second normally open contacts and a winding connected to allow current flow therethrough to the second current-control device first electrode, the second contact of the first relay being connected to the first contact of the second relay;

a control power source connected to the first contact of the relay;

and a main power control relay having normally open contacts closeable for connecting the load to the A-C power source and a winding connected between ground and the second relay second contact.

References Cited

UNITED STATES PATENTS

| | | | |
|---|---|---|---|
| 2,398,419 | 4/1946 | Finison | 317—147 |
| 2,815,446 | 12/1957 | Coombs | 317—31 |
| 3,010,068 | 11/1961 | Ferguson | 324—133 |
| 3,160,786 | 12/1964 | Faglie | 317—31 |
| 3,243,658 | 3/1966 | Blackburn | 317—18 |

JOHN F. COUCH, *Primary Examiner.*

R. V. LUPO, *Assistant Examiner.*

U.S. Cl. X.R.

317—51, 147

UNITED STATES PATENT OFFICE
CERTIFICATE OF CORRECTION

February 18, 1969

Patent No. 3,428,864

Harold G. Barber et al.

It is certified that error appears in the above identified patent and that said Letters Patent are hereby corrected as shown below:

Column 5, line 39, "electrode" should read -- electronic --. Column 8, line 19, after "a" insert -- first D-C control voltage proportional to the --; line 20, "ply proportional to the first D-C voltage," should read -- ply, --.

Signed and sealed this 31st day of March 1970.

(SEAL)
Attest:

Edward M. Fletcher, Jr.
Attesting Officer

WILLIAM E. SCHUYLER, JR.
Commissioner of Patents